United States Patent [19]
Blaschke

[11] 3,805,135
[45] Apr. 16, 1974

[54] APPARATUS FOR FIELD-ORIENTED CONTROL OR REGULATION OF ASYNCHRONOUS MACHINES

[75] Inventor: Felix Blaschke, Erlangen, Germany
[73] Assignee: Siemens Aktiengesellschaft, Munich, Germany
[22] Filed: Aug. 24, 1972
[21] Appl. No.: 283,404

[30] Foreign Application Priority Data
Sept. 4, 1971 Germany.......................... 2144422

[52] U.S. Cl.................. 318/227, 318/230, 318/231
[51] Int. Cl. ............................................ H02p 5/40
[58] Field of Search...................... 318/227, 230, 231

[56] References Cited
UNITED STATES PATENTS
3,500,158  3/1970  Landau et al...................... 318/227
3,512,067  5/1970  Landau.............................. 318/227
3,365,638  1/1968  Risberg........................... 318/227 X
3,675,099  7/1972  Johnston......................... 318/227 X Primary Examiner—Gene Z. Rubinson
Attorney, Agent, or Firm—Kenyon & Kenyon Reilly Carr & Chapin

[57] ABSTRACT

In a field orientation-controlled asynchronous machine which is fed by a converter with impressed stator current, the regulation of the magnitude of the current is brought to the highest dynamic quality of anticipatory control of the control loop, by letting an anticipatory control of the control loop take place via the set-point value and the deviation value. Through the action of these two anticipatory controls, the actual magnitude of the current follows its set-point value without delay, so that during dynamic transients the pre-set relation between the current angle and current magnitude is maintained at any point in time.

11 Claims, 3 Drawing Figures

[center]3,805,135[/center]

APPARATUS FOR FIELD-ORIENTED CONTROL OR REGULATION OF ASYNCHRONOUS MACHINES

BACKGROUND OF THE INVENTION

Pending U.S. Pat. application, Ser. No. 63,073, filed Aug. 12, 1970, concerns apparatus for the field-oriented control or regulation of the stator current vector of an asynchronous machine which is fed by a converter operating with impressed DC link current, with a link current control acting on the control paths of the rectifier and an angle switch for the control paths of the inverter acted upon by the components of a control vector. The control vector and the direct current of the link are determined here by two components of the desired stator current, of which one is pre-set parallel and the other perpendicular to the instantaneous axis of the rotating field. The phase angle and the magnitude of the stator current vector are here the controlled quantities.

It is an object of the present invention to improve the above apparatus in such a manner that the field-oriented determination of the stator current vector is achieved with decoupled adjustability of the torque and field producing components of the stator current not only under steady-state operating conditions, but also at any point in time during the transition from one steady-state operating condition to another. This involves that the stator current can follow, as far as possible without delay, any change of its field-oriented, pre-set control or set-point values.

According to the present invention, a converter is provided for variably presetting the field-oriented stator current components and an anticipatory control quantity which acts on the control paths of the rectifier and which is dependent on the derivative of the set-point value fed to the link current control. A basic idea of the invention is to slow down the rate of change of the field-oriented, pre-set stator current components in such a manner that through a lead-forming anticipatory control quantity the inertia inherent in the control of the impressed direct current of the link can be canceled exactly, and the change of the phase angle and the magnitude of the stator current takes place equally fast, i.e., practically without delay.

A particularly simple embodiment of the invention consists of the feature that for the setting of each of the two stator current components an integrator with negative feedback is provided and that, for forming the anticipatory control quantity, the respective input voltage of the one integrator and a quantity proportional to the output voltage of the other integrator are fed to the inputs of two multipliers, whose outputs are connected with the input of a summing amplifier, whereby separate differentiating members for forming the anticipatory quantity become unnecessary.

In order to be able to quickly counteract disturbances caused by the load, there is provided, according to a further embodiment of the invention, additional action upon the control paths of the rectifier by a quantity which corresponds to the mean value of the inverter input voltage.

The invention will be explained more fully in the following with the aid of an example of an embodiment.

DESCRIPTION OF THE DRAWINGS

The example is schematically illustrated by the accompanying drawings, in which.

DESCRIPTION OF THE PREFERRED EMBODIMENTS

Figure 1:
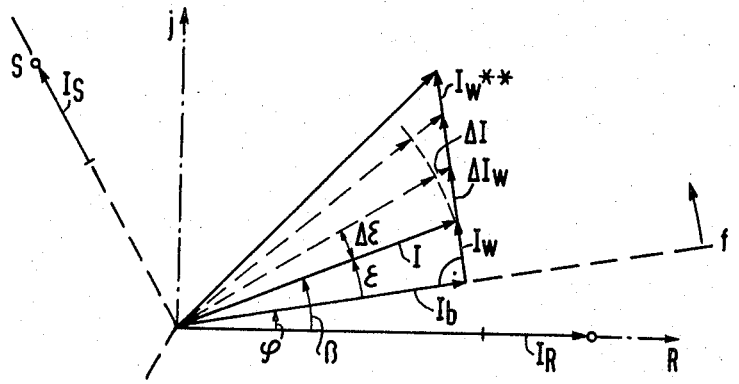
FIG. 1 is a vector diagram showing stator current components.

In the vector diagram, FIG. 1, the components of the stator current vector I, which rotate relative to the stator with the angular velocity $d\phi/dt = \phi$ and which are present in an asynchronous three-phase machine in three axes displaced in space by 120°, are designated with $I_R$, $I_S$, and $I_T$. This stator current vector could also be described in an orthogonal, likewise stator-referenced coordinate system with the axes R and j, whose origin lies in the axis of rotation of the machine. Let the axis designated with R of this orthogonal coordinate system coincide with the direction of the axis of the winding of the phase R. The field-oriented control or regulation, respectively, of the stator current vector according to the said pending application, comprises the feature of pre-setting the latter by means of two orthogonal components $I_b$ and $I_w$ which are referenced to the rotating-field axis f which rotates with the angular velocity $D\beta/dt = \beta$ relative to the coordinate system R, j, which is stationary with respect to the stator, where the quantity $I_b$ is parallel and $I_w$ perpendicular to the instantaneous rotating-field axis f. For any steady-state operating condition of the asynchronous machine, the components $I_b$ and $I_w$ are uni-directional quantities; $I_b$ corresponds here to the reactive current, i.e., the field-producing component of the stator current, and $I_w$ to the active current, i.e., the torque-producing component of the stator current.

In a modification developed further by the present invention, the controlled quantities of the stator current vector consists of the magnitude I and the angle $\epsilon$ of the latter relative to the rotating-field axis $f$. If, for instance, the field-orthogonal component $I_w$ is to be increased, as shown in the vector diagram of FIG. 1, by setting a new desired value $I_w^{}$, the individual controlled-quantity changes $\Delta\epsilon$ and $\Delta I$ should change together in such a manner that the end of the sum vector $I + \Delta I$ always moves only in the field-orthogonal direction, and that therefore no change of the field-parallel component $I_b$ of the stator current vector takes place. The same must, of course, apply in a similar manner for the case that only the field-parallel stator current component is changed. Generally, the end of the stator current vector is to move, as viewed in a field-axis related coordinate system, on a straight line, for whose angle $\gamma$ relative to the rotating-field axis f the relation $$\gamma = \arctan\left[(I_w^{} - I_w)/(I_b^{**} - I_b)\right]$$

holds, where $I_w^{}$ and $I_b^{}$ denote the newly set desired values for the stator current, as referred to a previously reached steady-state condition described by $I_b$, $I_w$.

Figure 2:
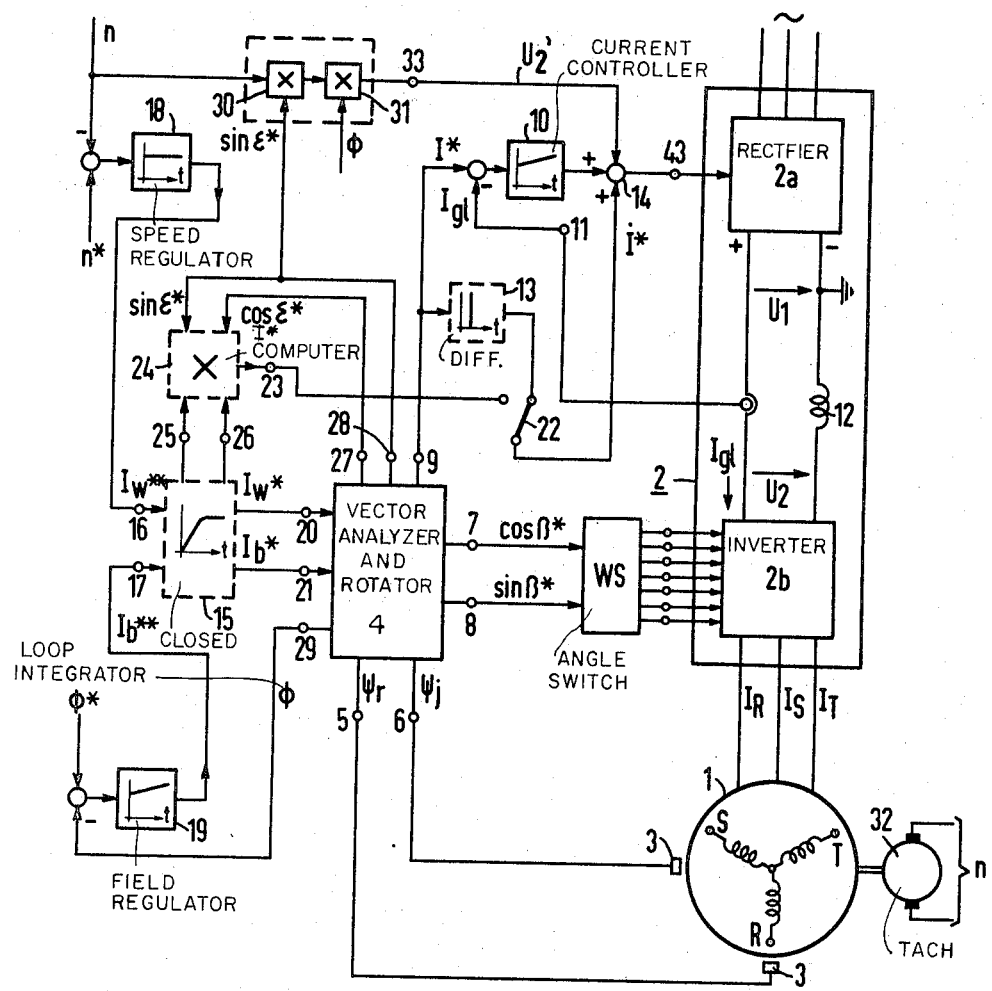
FIG. 2 is a diagram of the circuitry of the invention.

FIG. 2 shows two possibilities of realizing the above. Shown in dashed boxes are here in each case the element which have been added to those of the arrangement according to the said pending U.S. application. An asynchronous machine 1 is fed at its stator phase terminals R, S, T with impressed stator currents $I_R$, $I_S$ and $I_T$ from a three-phase system via an intermediate-link converter 2 which consists of a rectifier 2a and an inverter 2b. By two Hall probes, which are displaced on the armature circumference of the asynchronous machine by 90 electrical °, the air gap field is imaged by two voltages $\Psi_r$, $\Psi_j$, which are displaced in phase by 90°, and fed to a component computer 4. The latter consists of two vector analyzers and a vector rotator, or converter, and has the purpose of forming from two field axis-references, i.e., field-oriented, stator current components $I_w^*$ and $I_b^*$ and from the information obtained by the voltages $\Psi_r$, $\Psi_j$ regarding the angular position of the rotating field in the stator-referenced coordinate system R-j, two corresponding, normalized, stator-referenced component voltages $\cos \beta^*$ and $\sin \beta^*$ of a control vector, as well as at the output terminal 9 a quantity $I^*$ which is proportional to the magnitude of the stator current vector formed by the components $I_w^*$ and $I_b^*$, and which serves as the setting value for the link current control 10. Its output signal acts upon the input terminal 43 of a control unit which is provided for changing the rectifier output voltage $U_1$, but is not shown in detail.

From the component voltages $\cos \beta^*$, $\sin \beta^*$ information is generated in an angle switch WS via six discrete angle positions per revolution of the control vector and is transformed into corresponding control commands for firing the valves of the inverter 2b. At the output terminals of the angle switch WS, firing pulses are generated which control the valves of the inverter 2b in such a manner that the stator current vector always follows six discrete angle positions of the control vector described by the component voltages $\cos \beta^*$ and $\sin \beta^*$, practically without delay. Based on the field-orthogonally or field-parallel pre-set components $I_w^*$ and $I_b^*$ of the stator current, the latter is therefore changed as to magnitude ($I^*$) and phase ($\beta^*$).

As the arrangement shown in FIG. 2 involves a converter with impressed DC link current, in the DC link of which an inductance 12 is arranged, a change in the output voltage $U_1$, of the rectifier 2a will take effect fully as a corresponding change of the link current $I_{g1}$ only after a certain delay, while such a delay does not exist in the angle adjustment of the stator current vector, when the control quantities $\cos \beta^*$ and $\sin \beta^*$ are changed. With the arrangement described so far, this would lead to the situation that in principle with every change of the components pre-setting the stator current vector, the corresponding angle value is reached sooner than the associated magnitude value. An undesirable coupling would therefore exist between the field-producing and the torque-producing component of the stator current during the transition to the new pre-set value. In order to avoid this, the control unit of the rectifier 2 is now acted upon directly by an anticipatory control quantity $I^*$, which consists of the output signal of a differentiating member 13 connected to the output terminal 9 of the component computer 4, and which is added to the output signal of the link current control 10 in a mixing stage 14. The anticipatory control quantity is proportional to the time derivative $dI^*/dt$ of the set-point magnitude value $I^*$. The inductance 12 corresponds, seen from the point of view of control theory, to an integrating member with the driving voltage as the input quantity and the current as the output quantity. As it is driven by the differentiated set-point value of the magnitude value, a DC link current corresponding to the instantaneous set-point value of the magnitude $I^*$ is immediately forced thereby and is maintained in a steady state through the action of the link control 10.

For sudden changes of the desired values $I_w^*$ and $I_b^*$, and thereby also of the desired magnitude value $I^*$, the differentiation of the latter is technically impossible today, for which reason a converter for the continuously variable setting of these desired values is provided. Such a device for a variable presetting of a desired value is known per se and has been proposed, according to the German Pat. No. 1,126,487, for the starting and braking of speed-controlled electric motors. Its nature is that of a delay member; in the case presently under consideration, it acts in particular to transform sudden setting commands $I_w^{}$ and $I_b^{}$, such as can be generated by the superimposed speed regulator 18 or the field regulator 19, respectively, into the continuously varying stator current setting values $I_w^*$, $I_b^*$, which are fed to the input terminals 20 and 21 of the component computer 4.

A second variant for forming the anticipatory control quantity $I^*$ is obtained with the arrangement according to FIG. 2 if the switch arm designated with 22 is placed in its left-hand position, so that the mixing stage 14 is connected with the output terminal 23 of a multiplier 24. This multiplier forms, in a manner to be explained later, the anticipatory control quantity $I^*$ from the differentiated stator current set-point components $I_w^*$ and $I_b^*$ as well as from two field axis-referenced components $\cos \epsilon^*$ and $\sin \epsilon^*$ of a unit vector pointing in the direction of the stator current vector, which are available at the terminals 27 and 28 of the component computer 4. In case the converter 15 contains negative-feedback integrators for the continuously variable setting of the desired values, the output signals of which are the set-point values $I_w^*$ and $I_b^*$, no separate differentiating members are necessary in this variant, since then the required differentiated values of the stator current set-point components $I_w^*$ and $I_b^*$ are already available as the input quantities of these negative-feedback integrators. Here also, an extremely exact differentiation is achieved, as the parasitic time constant, which must be tolerated in otherwise customary differentiating members, is not present.

In order to be able to counteract rapidly disturbances caused by the load, the voltage $U_1$ at the end of the smoothing choke 12 connected to the converter on the line side is made to follow the voltage $U_2$ appearing at its other end. Through such decoupling of the circuit portion that follows the smoothing choke 12, the latter acquires the character of an integrator operating without reaction, with the result that its current can be determined, i.e., impressed, exclusively by its input quantity. This is done by applying a voltage $U_2$ corresponding to the input voltage of the inverter 2b, which however, is not taken now from the DC input voltage of the inverter 2b, which is very rich in harmonics, but is computed by means of two series-connected multipliers 30 and 31 from the magnitude $\phi$ of the field vector delivered at the output terminal 29 of the set-point computer 4, the speed-proportional voltage n of a tachometer generator 32 coupled with the three-phase machine 1 as well as from a voltage which corresponds to the field axis-referenced component sin $\epsilon^*$ of the unit vector pointing in the direction of the stator current vector; for it has been found that, assuming a sufficiently fast angle control, i.e., practically inertialess agreement of the instantaneously prescribed angle setting value with the angle value actually assumed by the stator current, the formulation $U_2 \approx U'_2 = n \cdot \phi \cdot \sin \epsilon^*$ applies, where the quantity $U'_2$, in contrast to the input voltage $U_2$ of the inverter 2b, is practically free of harmonics and therefore requires no longer any smoothing, which in principle delays the speed of the control.

Figure 3:
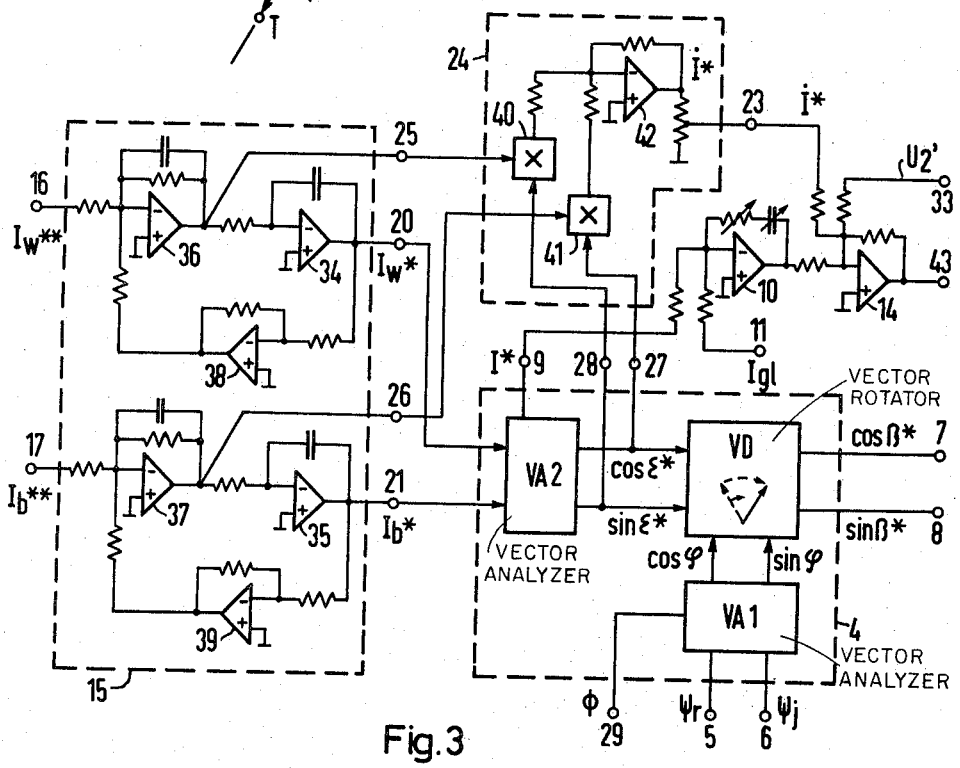
FIG. 3 diagrammatically shows details of components in FIG. 2.

FIG. 3 shows further details for the instrumentation of the functional groups designated as 4, 10, 14, 15 and 24 in FIG. 2. The set-value converter 15 consists of two integrators 34 and 35 in the form of amplifiers with capacitive negative feedback, which are preceded by delay members 36 and 37. The output signals of the two integrators 34 and 35 are negatively fed back via the inverter amplifiers 38 and 39, respectively, to the respective inputs of the delay members 36 and 37. In the overall view, the circuit arrangements consisting of the elements 34, 36, 38 and 35, 37, 39, respectively, constitute second-order delay members.

The component computer 4 comprises two vector analyzers VA1 and VA 2 as well as a vector rotator VD. The internal circuits and the operation of these functional blocks may be found in the German Published Patent Application 1,941,312. Therefore, if the input terminals 5 and 6 of the vector analyzer VA1 are fed voltages $\Psi_r$ and $\Psi_j$, which are proportional to the components of the rotating-field vector that fall into the axes R, of the stator-references coordinate system (FIG. 1), a quantity proportional to the magnitude $\phi$ of the rotating-field vector is generated in the manner known per se at the output terminal 29, and at the other two outputs of the vector analyzer VA1 are generated two voltages $\cos \phi$ and $\sin \phi$ proportional to the stator-referenced components of a unit vector pointing in the direction of the instantaneous rotating-field axis, where the relation $\phi = \arctan \Psi_j/\Psi_r$ applies. In a similar manner, there appears at the output terminal 9 of the vector analyzer VA2 a quantity which is proportional to the magnitude set-point value I* of the stator current I, and at its output terminals 27 and 28, two voltages $\cos \epsilon^*$ and $\sin \epsilon^*$ which correspond to the components of a unit vector, which in the revolving, field axis-referenced coordinate system, always points in the direction of the stator current vector, where the relation applies $:\epsilon^* = \arctan (I_w^*/I_b^*)$.

For a steady-state operating condition of the asynchronous machine, $I_w^*$, $I_b^*$, $I^*$, $\cos \epsilon^*$ and $\sin \epsilon^*$ are uni-directional values. The quantities $\cos \epsilon^*$, $\sin \epsilon^*$, and $\cos \phi$ and $\sin \phi$ are fed to the vector rotator, which consists in a manner known per se of four multipliers and two summing amplifiers, in such a way that at the output terminals 7 and 8 of the vector rotator VD two voltages $\cos \beta^*$ and $\sin \beta^*$, respectively, appear, which indicate the angle position of the field-orientation predetermined stator current vector in the stator-referenced coordinate system, where the relation holds: $\beta^* = \phi + \epsilon^*$. The component voltages $\cos \beta^*$ and $\sin \beta^*$ represent a control vector and can act on the angle switch 11 either directly or, as already proposed elsewhere, with the interposition of an angle control circuit.

The output terminal 9 of the set-point computer 4 is connected with the set-point input of the link current control 10, which consists of an amplifier with resistive-capacitive feedback. Its input terminal 11 has applied to it the actual value of the DC link current $I_{g1}$, which is supplied by a DC transformer arranged in the DC link circuit.

The anticipatory control quantity $I^*$ which, as already mentioned, is to correspond to the time derivative of the magnitude setting value $I^*$, is now formed in the device 24, which contains two multipliers 40 and 41 as well as a summing amplifier 42. On the input side, the multipliers 40 and 41 are connected with the terminals 25 and 26 of the set-value converter 15, at which the input voltages of the integrators 34 and 35, i.e., the differentiated output quantities $I_w^*$ and $I_b^*$, appear. Addition of the output quantities of the multipliers 40 and 41 yields at the output 23 of the summing amplifier a quantity in the form $I_b^* \cdot \cos \epsilon^* + I_w^* \cdot \sin \epsilon^*$, which, as can be shown, corresponds exactly to the time derivative of the magnitude set-point value $I^*$. This anticipatory control quantity is fed to an input of the mixing stage 14 (which has the form of a summing amplifier), whose other inputs are connected with the output of the link current control 10 and with the terminal 33. The output of the summing amplifier 14 is connected with the input terminal 43 of a control unit associated with the control paths of the rectifier 2a.

Overall, the present invention constitutes an advantageous way, if the field-oriented set-point value is given, to make the corresponding actual values follow exactly at any point in time their set-point values, while cancelling to a large extent disturbance effects caused by the structure of the control path.

What is claimed is:

1. Apparatus for the field oriented control of the current vector of an asynchronous machine comprising:
   a. a controlled rectifier coupled to a source of AC power;
   b. a controlled inverter providing outputs to the stator windings of the asynchronous machine;
   c. a DC link including a smoothing choke coupling the output of said controlled rectifier to the input of said controlled inverter;
   d. means to sense the two components of the field vector of the machine referenced to a fixed stator axis;
   e. means to provide as inputs two components of a desired current vector referenced to the field vector;
   f. means having said field vector components and said current vector components as inputs to develop therefrom a quantity representing the absolute magnitude vector of the desired current and the angle of said current vector with respect to said slator axis;
   g. means responsive to the current magnitude to control said controlled rectifier;
   h. means responsive to the angle of said vector to control said controlled inverter; and wherein the improvement comprises:
   i. means for smoothing said input components of a desired current vector, and
   j. means for developing an anticipatory control quantity which is a function of the derivative of said current absolute magnitude and for providing said anticipatory control quantity as an additional input to said means responsive to the current magnitude.

2. The invention according to claim 1 wherein said smoothing means comprise first and second means for integration.

3. The invention according to claim 2 wherein each of said first and second means for integration comprise:

a. delay means having a desired current component as an input;
b. an integrator coupled to the output of said delay means and providing its output as the smoothed output; and
c. feed back means negatively coupling the output of said integrator to the input of said delay means.

4. The invention according to claim 3 wherein said means for developing the angle and magnitude of said current vector also include means for developing a representation of the sine and cosine of the angle of said field vector with said stator reference axis and said means for developing said anticipatory control quantity comprise:

a. a first multiplier having as inputs the input to one of said integrators and said sine representation;
b. a second multiplier having as inputs the input to the other of said integrators and said cosine representation; and
c. a summing amplifier having the outputs of said first and second multipliers as inputs and providing said anticipatory control quantity as an output.

5. The invention according to claim 4 and further including means to develop a quantity representing the input voltage at said controlled inverter and means to add said quantity as an additional input to said means responsive to current magnitude.

6. The invention according to claim 3 and further including means to develop a quantity representing the input voltage at said controlled inverter and means to add said quantity as an additional input to said means responsive to current magnitude.

7. The invention according to claim 6 wherein said assynchronous motor has a tachometer associated therewith, said means for developing said current magnitude and angle further includes means for developing a quantity proportional to the sine of the angle between said current vector and said field vector and a quantity proportional to the magnitude of said field vector and wherein said means to develop said quantity representing said input voltage comprises means having as inputs the output of said tachometer, said sine and said field vector magnitude and providing an output proportional to the product of said quantities, said means comprising:

a. a first multiplier having two of said quantities as inputs; and
b. a second multiplier having the output of said first multiplier and the third quantity as inputs.

8. The invention according to claim 2 and further including means to develop a quantity representing the input voltage at said controlled inverter and means to add said quantity as an additional input to said means responsive to current magnitude.

9. The invention according to claim 8 wherein said assynchronous motor has a tachometer associated therewith, said means for developing said current magnitude and angle further includes means for developing a quantity proportional to the sine of the angle between said current vector and said field vector and a quantity proportional to the magnitude of said field vector and wherein said means to develop said quantity representing said input voltage comprises means having as inputs the output of said tachometer, said sine and said field vector magnitude and providing an output proportional to the product of said quantities, said means comprising:

a. a first multiplier having two of said quantities as inputs; and
b. a second multiplier having the output of said first multiplier and the third quantity as inputs.

10. The invention according to claim 1 and further including means to develop a quantity representing the input voltage at said controlled inverter and means to add said quantity as an additional input to said means responsive to current magnitude.

11. The invention according to claim 10 wherein said assynchronous motor has a tachometer associated therewith, said means for developing said current magnitude and angle further includes means for developing a quantity proportional to the sine of the angle between said current vector and said field vector and a quantity proportional to the magnitude of said field vector and wherein said means to develop said quantity representing said input voltage comprises means having as inputs the output of said tachometer, said sine and said field vector magnitude and providing an output proportional to the product of said quantities, said means comprising:

a. a first multiplier having two of said quantities as inputs; and
b. a second multiplier having the output of said first multiplier and the third quantity as inputs.

* * * * *

UNITED STATES PATENT OFFICE
CERTIFICATE OF CORRECTION

Patent No. 3,805,135     Dated April 16, 1974

Inventor(s) Felix Blaschke

It is certified that error appears in the above-identified patent and that said Letters Patent are hereby corrected as shown below:

In column 1, line 8, change "filed August 12, 1970" to --filed August 12, 1970, now abandoned--

In column 2, line 31, change "$D\beta/dt = \dot{\beta}$" to --$D\beta/dt\dot{\beta} = \dot{\beta}$--

In column 3, line 59 change "control quantity I*" to --control quantity $\dot{I}$*-- and throughout application.

Signed and sealed this 3rd day of December 1974.

(SEAL)
Attest:

McCOY M. GIBSON JR.
Attesting Officer

C. MARSHALL DANN
Commissioner of Patents